(12) United States Patent
Markov et al.

(10) Patent No.: US 12,554,423 B2
(45) Date of Patent: Feb. 17, 2026

(54) ACCELERATED PROGRAMMING OF FOUR GATE, SPLIT-GATE FLASH MEMORY CELLS

(71) Applicant: Silicon Storage Technology, Inc., San Jose, CA (US)

(72) Inventors: Viktor Markov, Santa Clara, CA (US); Jong-Won Yoo, Morgan Hill, CA (US); Alexander Kotov, San Jose, CA (US)

(73) Assignee: Silicon Storage Technology, Inc., San Jose, CA (US)

( * ) Notice: Subject to any disclaimer, the term of this patent is extended or adjusted under 35 U.S.C. 154(b) by 89 days.

(21) Appl. No.: 18/594,492

(22) Filed: Mar. 4, 2024

(65) Prior Publication Data
US 2025/0190125 A1 Jun. 12, 2025

Related U.S. Application Data

(60) Provisional application No. 63/607,409, filed on Dec. 7, 2023.

(51) Int. Cl.
*G06F 3/06* (2006.01)

(52) U.S. Cl.
CPC .......... *G06F 3/0625* (2013.01); *G06F 3/0659* (2013.01); *G06F 3/0673* (2013.01)

(58) Field of Classification Search
CPC ..... G06F 3/0625; G06F 3/0659; G06F 3/0673
USPC ....................................... 365/185.18, 185.24
See application file for complete search history.

(56) References Cited

U.S. PATENT DOCUMENTS

| | | | | |
|---|---|---|---|---|
| 5,557,569 | A | * | 9/1996 | Smayling ........... G11C 16/0416 257/E27.103 |
| 7,868,375 | B2 | | 1/2011 | Liu et al. |
| 8,488,388 | B2 | | 7/2013 | Markov et al. |
| 10,079,061 | B2 | | 9/2018 | Qian et al. |
| 10,381,083 | B1 | * | 8/2019 | Yang ....................... G11C 16/30 |
| 10,861,571 | B1 | * | 12/2020 | Yang ...................... G11C 16/24 |
| 11,133,074 | B1 | * | 9/2021 | Li ....................... G11C 16/3472 |

(Continued)

FOREIGN PATENT DOCUMENTS

| | | |
|---|---|---|
| EP | 3 101 694 A2 | 12/2016 |
| TW | 202042116 A | 11/2020 |

OTHER PUBLICATIONS

V. Markov et al., "Optimization of programming conditions and endurance enhancement of SuperFlash® memory," Proc. IEEE IRPS, 2017, pp. PM-9.1-PM-9.4.

(Continued)

*Primary Examiner* — Michael T Tran
(74) *Attorney, Agent, or Firm* — DLA Piper LLP (US)

(57) ABSTRACT

A method of programming a memory device comprising control gate lines, erase gate lines, select gate lines, source lines and bit lines connected to rows and columns of memory cells, the method comprising performing an erase operation that includes applying a first voltage to one of the erase gate lines, performing a pre-program operation that includes electrically connecting the one of the erase gate lines to a pair of the control gate lines to use positive charge on the one of the erase gate lines from the erase operation to pre-charge the pair of the control gate lines, and performing a program operation that includes applying a second voltage to the one of the erase gate lines and the pair of the control gate lines.

16 Claims, 3 Drawing Sheets

(56) References Cited

U.S. PATENT DOCUMENTS

| | | | |
|---|---|---|---|
| 11,508,440 B1* | 11/2022 | Zhao | G11C 16/0483 |
| 2022/0262724 A1* | 8/2022 | Tabata | H10B 43/40 |

OTHER PUBLICATIONS

Taiwanese Office Action mailed on Aug. 19, 2025 corresponding to the related Taiwanese Patent Application No. 113144817.

* cited by examiner

| Operation | K1 | K2 | K3 |
|---|---|---|---|
| Erase | X | * | X |
| Erase end | * | * | * |
| Pre-program | * | X | * |
| Program | X | X | * |
| Program end | * | X | X |

X = On State    * = Off State

| Operation | K1 | K2 | K3 |
|---|---|---|---|
| Erase | X | * | X |
| Erase end | * | * | * |
| Pre-program | X | X | * |
| Program | X | X | * |
| Program end | * | X | X |

X = On State   * = Off State

ACCELERATED PROGRAMMING OF FOUR GATE, SPLIT-GATE FLASH MEMORY CELLS

RELATED APPLICATIONS

This application claims the benefit of U.S. Provisional Application No. 63/607,409, filed Dec. 7, 2023, and which is incorporated herein by reference.

FIELD OF THE INVENTION

The present invention relates to non-volatile memory arrays.

BACKGROUND OF THE INVENTION

Split-gate non-volatile memory devices are well known in the art. See for example U.S. Pat. No. 7,868,375, which discloses a four-gate memory cell configuration, and which is incorporated herein by reference for all purposes. Specifically, FIG. 1 of the present disclosure illustrates a pair 11 of split gate memory cells 10 each with spaced apart source and drain regions 14/16 formed in a silicon semiconductor substrate 12. The source region 14 can be referred to as a source line SL (because it commonly is connected to other source regions for other memory cells in the same row or column), and the drain region 16 is commonly connected to a bit line. A channel region 18 of the substrate 12 extends between the source/drain regions 14/16. A floating gate 20 is disposed over (i.e., vertically over and laterally overlapping) and insulated from (and directly controls the conductivity of) a first portion of the channel region 18 (and is partially over and insulated from the source region 14). A control gate 22 is disposed over and insulated from the floating gate 20. A select gate 24 (also referred to as a word line gate) is disposed over and insulated from (and directly controls the conductivity of) a second portion of the channel region 18. An erase gate 26 is disposed over and insulated from the source region 14 and is laterally adjacent to the floating gate 20. The erase gate 26 can include a notch that faces an edge of the floating gate 20.

A plurality of such memory cells 10 can be arranged in rows and columns to form a memory cell array, as illustrated in FIG. 2. While FIG. 1 only shows a pair 11 of memory cells 10 (sharing a common source region 14 and erase gate 26), the memory cell pairs can be placed end to end to form a column of memory cells (where adjacent memory cell pairs can share a common drain region). While only two such columns are shown in FIG. 2, there can be many such columns. Each column can include a bit line 16a electrically connecting together all the drain regions 16 in the column. Each row of memory cells can include a control gate line 22a electrically connecting together all the control gates 22 in the row of memory cells. For example, all the control gates 22 in each row of memory cells can be formed as a continuous line of conductive material, where a portion of the continuous line passing through any given memory cell serves as its control gate 22. Each row of memory cells can include a select gate line 24a electrically connecting together all the select gates 24 in the row of memory cells. For example, all the select gates 24 in each row of memory cells can be formed as a continuous line of conductive material, where a portion of the continuous line passing through any given memory cell serves as its select gate 24. Each row of memory cell pairs can include an erase gate line 26a electrically connecting together all the erase gates 26 in the row of memory cell pairs. For example, all the erase gates 26 in each row of memory cell pairs can be formed as a continuous line of conductive material, where a portion of the continuous line passing through any given memory cell pair serves as its erase gate 26. Finally, each row of memory cell pairs can include a source line 14a electrically connecting together all the source regions 14 in the row of memory cell pairs. For example, all the source regions 14 in each row of memory cell pairs can be formed as a continuous line of conductive diffusion in the substrate 12, where a portion of the continuous line passing through any given memory cell pair serves as its source region 14.

Various combinations of voltages are applied to the control gate 22, select gate 24, erase gate 26 and source and drain regions 14/16, to program the split gate memory cell 10 (i.e., inject electrons onto the floating gate 20), to erase the split gate memory cell 10 (i.e., remove electrons from the floating gate 20), and to read the split gate memory cell 10 (i.e., measure or detect the conductivity of the channel region 18, by for example measuring or detecting a read current through the channel region 18, to determine the programming state of the floating gate 20).

Split gate memory cell 10 can be operated in a digital manner, where the split gate memory cell 10 is set to one of only two possible states: a programmed state and an erased state. The split gate memory cell 10 is erased by placing a high positive voltage on the erase gate 26, and optionally a negative voltage on the control gate 22, to induce tunneling of electrons from the floating gate 20 to the erase gate 26 (leaving the floating gate 20 in a more positively charged state—the erased state). Split gate memory cell 10 can be programmed by placing positive voltages on the control gate 22, erase gate 26, select gate 24 and source region 14, and a current on drain region 16. Electrons will then flow along the channel region 18 from the drain region 16 toward the source region 14, with electrons becoming accelerated and heated whereby some of them are injected onto the floating gate 20 by hot-electron injection (leaving the floating gate 20 in a more negatively charged state—the programmed state).

Split gate memory cell 10 can be read by placing positive voltages on the select gate 24 (turning on the portion of channel region 18 under the select gate 24 by making it conductive) and drain region 16 (and optionally on the erase gate 26 and the control gate 22), and sensing current flow through the channel region 18. If the floating gate 20 is positively charged (i.e. split gate memory cell 10 is erased), the split gate memory cell 10 will turn on because the both portions of the channel region 18 are conductive due to the lack of electrons on the floating gate 20, and electrical current will flow from drain region 16 to source region 14 (i.e. the split gate memory cell 10 is sensed to be in its erased "1" state based on sensed current flow). If the floating gate 20 is negatively charged (i.e. split gate memory cell 10 is programmed), the portion of channel region 18 under the floating gate is turned off (low conductivity), thereby preventing appreciable current flow (i.e., the split gate memory cell 10 is sensed to be in its programmed "0" state based on no, or minimal, current flow). Memory cells 10 are considered non-volatile because they retain their logic (program) state even when power is not applied to the semiconductor device.

Split gate memory cell 10 can alternately be operated in an analog manner where the memory state (i.e. the amount of charge, such as the number of electrons, on the floating gate 20) of the split gate memory cell 10 can be incrementally changed anywhere from a fully erased state (minimum number of electrons on the floating gate 20) to a fully programmed state (maximum number of electrons on the floating gate 20), or just a portion of this range. This means the split gate memory cell 10 storage is analog, which allows for very precise and individual tuning of each split gate memory cell 10 in an array of split gate memory cells 10. Alternatively, the split gate memory cell 10 could be operated as an MLC (multilevel cell) where it is configured to be programmed to one of many discrete values (such as 16 or 64 different values).

Often the memory cells are programmed immediately after they are erased. This means that the memory cells transition from a high voltage applied to their erase gates (used to remove electrons from the floating gates) to lower program voltages applied to the control gates 22, select gates 24, erase gates 26 and source regions 14 for selected memory cells (used to add electrons to the floating gates). This transition can be relatively time and power consuming.

There is a need for a technique to reduce the time and power involved in transitioning from an erase operation to a program operation.

BRIEF SUMMARY OF THE INVENTION

The aforementioned problems and needs are addressed by a method of programming a memory device comprising control gate lines, erase gate lines, select gate lines, source lines and bit lines connected to rows and columns of memory cells, the method comprising performing an erase operation that includes applying a first voltage to one of the erase gate lines, performing a pre-program operation that includes electrically connecting the one of the erase gate lines to a pair of the control gate lines to use positive charge on the one of the erase gate lines from the erase operation to pre-charge the pair of the control gate lines, and performing a program operation that includes applying a second voltage to the one of the erase gate lines and the pair of the control gate lines.

A memory device comprises memory cells arranged in rows and columns, wherein respective memory cells includes a source region, a drain region, a floating gate, a control gate, a select gate and an erase gate, a first control gate line electrically connecting together the control gates in a first row of the memory cells, a second control gate line electrically connecting together the control gates in a second row of the memory cells, wherein the first control gate line is electrically connected to the second control gate line, an erase gate line electrically connecting together the erase gates in the first and second rows of the memory cells, a source line electrically connecting together the source regions in the first and second rows of the memory cells, a charge pump, a first switch to electrically connect, in its on state, the charge pump to the erase gate line, and to disconnect, in its off state, the charge pump from the erase gate line, a second switch to electrically connect, in its on state, the erase gate line to the first control gate line and the second control gate line, and to disconnect, in its off state, the erase gate line from the first control gate line and the second control gate line, a third switch to electrically connect, in its on state, the first control gate line and the second control gate line to a reference potential, and to disconnect, in its off state, the first control gate line and the second control gate line from the reference potential, and a control circuitry to perform an erase operation that includes to place the first switch in its on state, to place the second switch in its off state, to place the third switch in its on state, and to cause the charge pump to generate a first voltage, so as to apply the first voltage from the charge pump to the erase gate line, perform a pre-program operation that includes to place the second switch in its on state, so as to cause a positive charge on the erase gate line from the erase operation to pre-charge the first and second control gate lines, and perform a program operation that includes to place the first switch in its on state, to place the second switch in its on state, and to cause the charge pump to generate a second voltage, so as to apply the second voltage from the charge pump to the erase gate line and to the first and second control gate lines.

Other objects and features of the present disclosure will become apparent by a review of the specification, claims and appended figures.

DETAILED DESCRIPTION OF THE INVENTION

Figure 1:
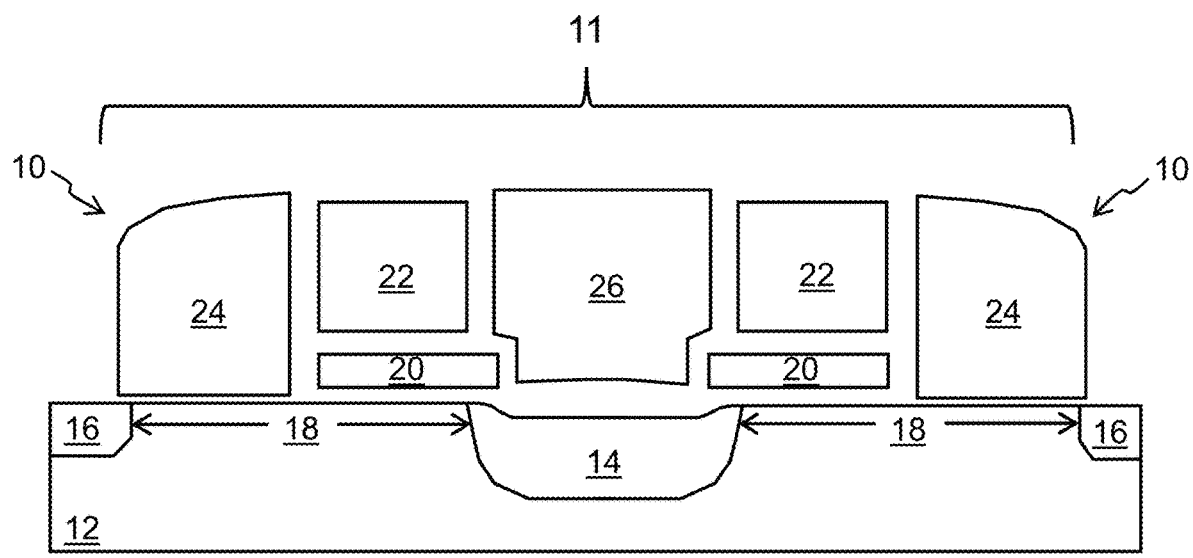
FIG. 1 is a cross sectional view of a conventional memory cell.
Figure 2:
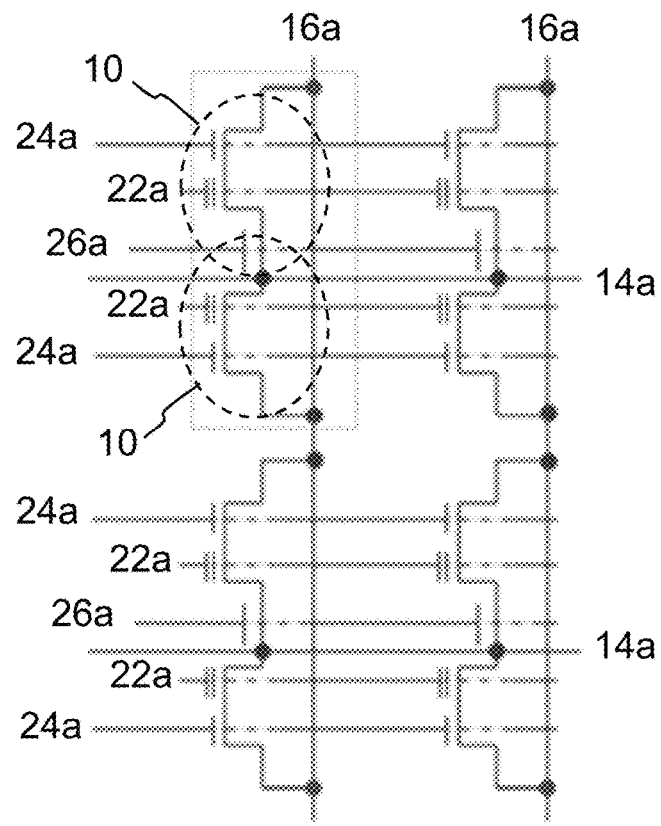
FIG. 2 is a diagram showing a conventional memory array architecture.
Figures 3, 4:
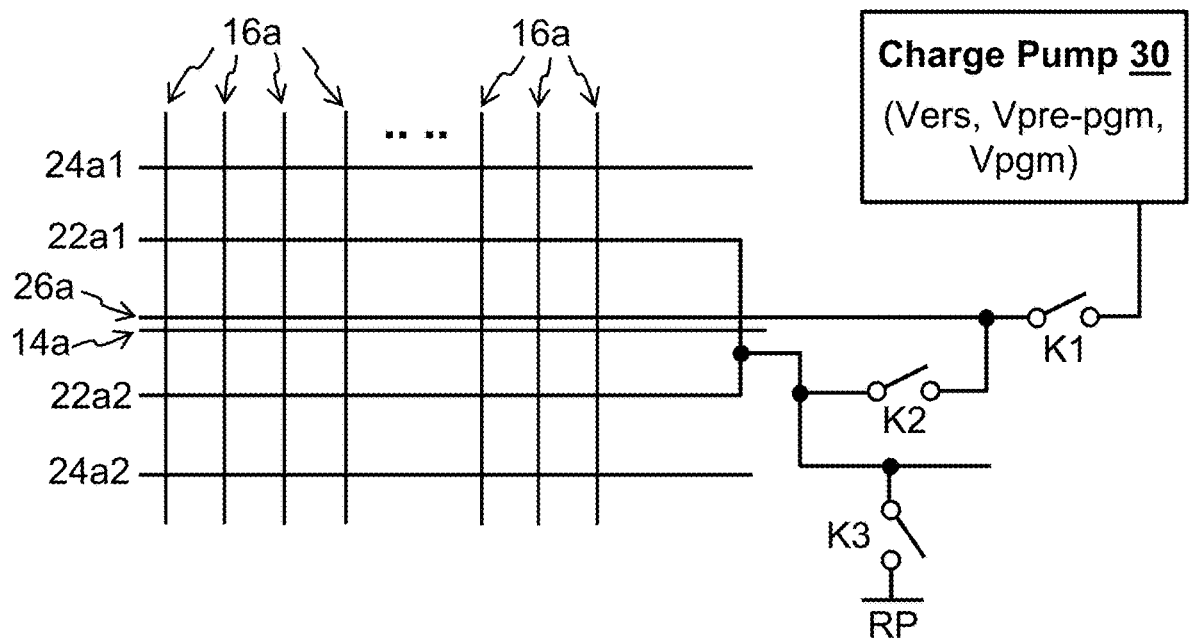
FIG. 3 is a diagram showing an example of a memory array architecture.
FIG. 4 is a table showing a first example of the operation of the switches during different memory cell operations for the memory array architecture of FIG. 3.

A method and device for transitioning from an erase operation to a program operation is disclosed for memory cells of the type shown in FIG. 1, oriented in rows and columns and connected with various lines as shown in FIG. 2. The method and device involves the line configurations as shown in FIG. 3, which shows the line configuration for just one of the rows of memory cell pairs 11 of memory cells 10 (i.e., first and second select gate lines 24$a$1 and 24$a$2 (a pair of the select gate lines), wherein first select gate line 24$a$1 electrically connects together the select gates in a first row of the memory cells 10 and second select gate line 24$a$2 electrically connects together the select gates in a second row of the memory cells 10, first and second control gate lines 22$a$1 and 22$a$2 (a pair of the control gate lines), wherein first control gate line 22$a$1 electrically connects together the control gates in a first row of the memory cells 10 and second control gate line 22$a$2 electrically connects together the control gates in a second row of the memory cells 10, source line 14$a$, and erase gate line 26$a$, all extending in the row direction, and bit lines 16$a$ all extending in the column direction). The configuration of the lines in FIG. 3 is similar to that in FIG. 2, but with the following differences. The pair of control gate lines (first control gate line 22$a$1 and second control gate line 22$a$2) are electrically connected together. A first switch K1 alternately electrically connects and disconnects a charge pump 30 and the erase gate line 26$a$. Charge pump 30 supplies different voltages during an erase operation (e.g., Vers), a pre-program operation (e.g., Vpre-pgm), and a program operation (e.g., Vpgm), respectively, described in more detail below. A second switch K2 alternately electrically connects and disconnects erase gate line 26$a$ and first and second control gate lines 22$a$1 and 22$a$2. A third switch K3 alternately electrically connects and disconnects first and second control gate lines 22*a*1 and 22*a*2 and a reference potential RP (e.g. ground Gnd). Each of the switches has an on state where it is electrically conductive (i.e., the switch is closed and electrically connects the respective lines/components together), as well as an off state where it is not electrically conductive (i.e., the switch is open and does not electrically connect the respective lines/components together-disconnects the respective lines/components from each other). As used herein, to place a switch in a particular state includes both changing the switch's state to that particular state (from another state) and maintaining the switch in that particular state if it was previously already in that particular state. Switches K1-K3 can be implemented at any convenient locations.

The switch configurations for erase, pre-program, program, and program end operations are summarized in FIG. 4. During an erase operation (which will erase all the memory cells in the row of memory cell pairs 11 that share erase gate line 26*a*), charge pump 30 provides a high erase voltage Vers (a first voltage), while first and third switches K1 and K3 are on, and second switch K2 is off. This results in the erase voltage Vers being applied to just the erase gate line 26*a*, while first and second control gate lines 22*a*1 and 22*a*2 are electrically connected to reference potential RP. To safeguard the application of the erase voltage Vers during the erase operation, second switch K2 can be placed in its off state and third switch K3 can be placed in its on state, before first switch K1 is placed in its on state. The select gate lines 24*a*1 and 24*a*2 and the source line 14*a* can be connected to reference potential RP as well during the erase operation (switches to connect select gate lines 24*a*1 and 24*a*2 and the source line 14*a* to reference potential RP not shown). At the end of the erase operation (erase end), first switch K1 and third switch K3 can be placed in their off states.

Then, in a pre-program operation that follows the erase operation, second switch K2 is placed in its on state while first switch K1 and third switch K3 remain in their off states, where the erase gate line 26*a* is electrically connected to the first and second control gate lines 22*a*1 and 22*a*2. This serves to cause the positive charge stored on the erase gate line 26*a* from the previous erase operation to pre-charge the first and second control gate lines 22*a*1 and 22*a*2 and leave erase gate line 26*a* also in a pre-charged state. It has been determined that the final voltage on the erase gate line 26*a* and first and second control gate lines 22*a*1 and 22*a*2 can be between one third to one half of the erase voltage Vers that was applied to the erase gate line 26*a* during the earlier erase operation.

Then, in a program operation that follows the pre-program operation (which will program selected ones of the memory cells (target memory cells) by injecting electrons onto their floating gates), charge pump 30 provides a program voltage Vpgm (a second voltage), while first switch K1 and second switch K2 are placed in their on states, and the third switch K3 is in its off state. This results in the program voltage Vpgm being applied to the erase gate line 26*a* and the first and second control gate lines 22*a*1 and 22*a*2. While the program voltage Vpgm voltage is applied to the erase gate line 26*a* and first and second control gate lines 22*a*1 and 22*a*2, other positive program voltages are applied from other voltage sources (i.e. one or more other charge pumps) to the select gate lines 24*a*1, 24*a*2, source line 14*a* for the target memory cells, and a current is supplied to the bit lines 16*a* of the target memory cells, so that the target memory cells are programmed. By raising the voltage on the erase gate line 26*a* and first and second control gate lines 22*a*1 and 22*a*2 from the voltage achieved during the pre-program operation to the program voltage Vpgm in the program operation, instead of raising these lines from a zero voltage state to the program voltage Vpgm, transition time and power consumption are reduced. Power and energy consumption is also reduced because charge pump 30 can remain off during the pre-program operation.

After the program operation is over, a program end operation can be performed, where second switch K2 and third switch K3 can be placed in their on states while the first switch K1 is placed in its off state, which electrically connects the erase gate line 26*a* and the first and second control gate lines 22*a*1 and 22*a*2 to reference potential RP, discharging these lines.

Figures 5, 6:
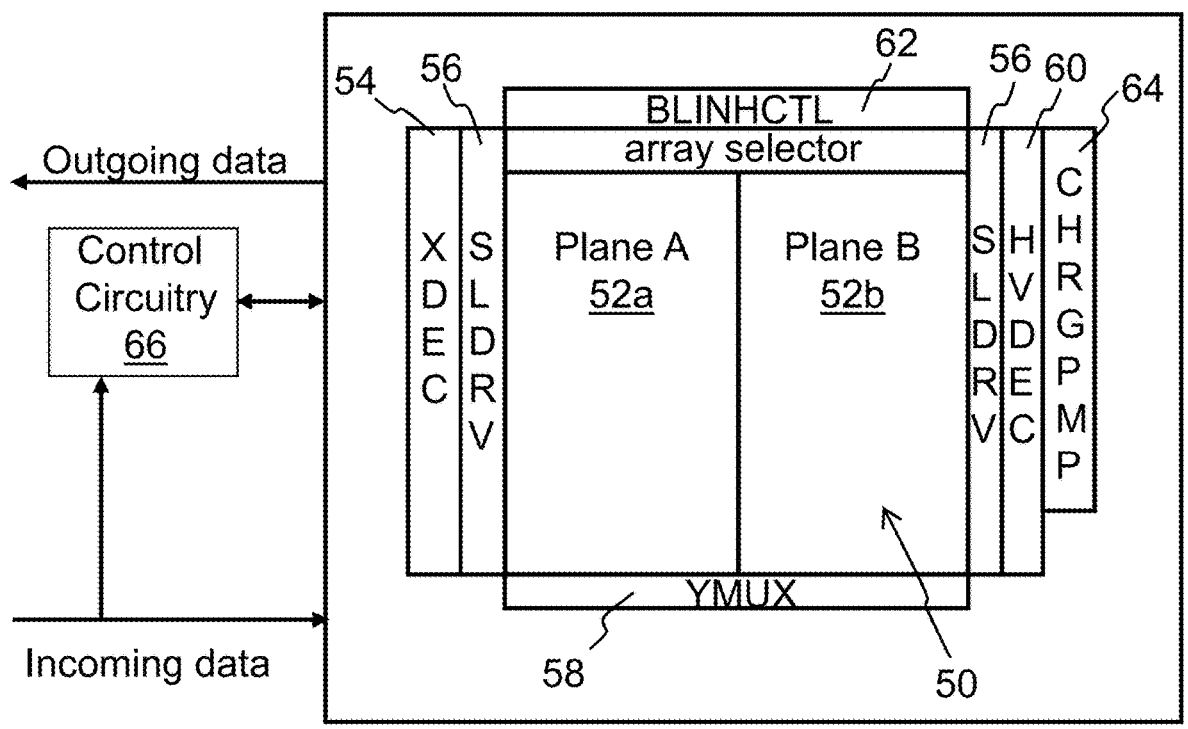
FIG. 5 is a table showing a second example of the operation of the switches during different memory cell operations for the memory array architecture of FIG. 3.
FIG. 6 is a diagram showing the architecture of an example memory device.

FIG. 5 illustrates another example, which is similar to that illustrated in FIG. 4, but where first switch K1 can be placed in its on state during the pre-program operation. Should the floating potential on the erase gate line 26*a* and first and second control gate lines 22*a*1 and 22*a*2 (resulting from the positive charge stored on the erase gate line 26*a* from the previous erase operation) be too low or not sustained long enough (e.g., due to leakage), charge pump 30 can be turned on to generate a pre-program voltage Vpre-pgm (a third voltage), with first switch K1 additionally placed in its on state during the pre-program operation, so as to further charge the erase gate line 26*a* and first and second control gate lines 22*a*1 and 22*a*2 as needed during the pre-program operation.

While the above examples illustrate the switch configurations for a single row of memory cell pairs 11 (that includes two rows of the memory cells 10), it should be understood that these examples can be implemented in others, or all, of the rows of memory cell pairs 11 in a memory array. The above-described programming techniques have many advantages. The resulting memory device exhibits higher performance, with reduced time needed to program data. The device consumes less power, by utilizing the charge stored on the erase gate lines after the erase operation to pre-charge the control gate lines for programming, compared to discharging the erase gate line to a reference potential RP such as ground after the erase operation first and then performing the program operation.

The architecture of an example memory device is illustrated in FIG. 6. The memory device includes an array 50 of the non-volatile memory cells 10, which can be segregated into two separate planes (Plane A 52*a* and Plane B 52*b*). The memory cells 10 can be of the type shown in FIG. 1 formed on a single chip, arranged in a plurality of rows and columns in the semiconductor substrate 12 as depicted in FIG. 2 and include the switches K1-K3 as shown in FIG. 3. Adjacent to the array of non-volatile memory cells are address decoders, such as low voltage LV row decoder 54 (e.g., XDEC), source line driver 56 (e.g. SLDRV), column decoder 58 (e.g. YMUX), high voltage row decoder 60 (e.g. HVDEC) and a bit line controller 62 (e.g., BLINHCTL), which are used to decode addresses and supply the various voltages to the various memory cell gates and regions during read, program, and erase operations for selected memory cells. Column decoder 58 includes a sense amplifier containing circuitry for measuring the currents on the bit lines during a read operation. Control circuitry 66 controls the various device elements to implement each operation (program, erase, read) on target memory cells, including the peripheral circuits mentioned above and switches K1-K3, to provide the signals on the various lines. As a non-limiting example, switches K1-K3 can be included as part of high voltage row decoder 60. Charge pump CHRGPMP 64 provides the various voltages used to read, program and erase the memory cells under the control of the control circuitry 66, and includes therein charge pump 30. Control circuitry 66 operates the memory device to program, erase and read the memory cells 10.

It is to be understood that the present disclosure is not limited to the example(s) described above and illustrated herein, but encompasses any and all variations falling within the scope of any claims. For example, while the examples above involve a four-gate memory cell, and the charging of the control gate lines from the erase gate lines after an erase operation, the above-described configurations and techniques can be used with memory cells with different gate and line configurations, where the line used to erase memory cells can be used to charge a different line used for subsequent programming. References to the present disclosure or invention or examples herein are not intended to limit the scope of any claim or claim term, but instead merely make reference to one or more features that may be covered by one or more claims. Materials, processes, and numerical values described above are examples only, and should not be deemed to limit the claims. Lastly, the terms "forming" and "formed" as used herein shall include material deposition, material growth, or any other technique in providing the material as disclosed or claimed.

It should be noted that, as used herein, the terms "over" and "on" both inclusively include "directly on" (no intermediate materials, elements or space disposed there between) and "indirectly on" (intermediate materials, elements or space disposed there between). Likewise, the term "adjacent" includes "directly adjacent" (no intermediate materials, elements or space disposed there between) and "indirectly adjacent" (intermediate materials, elements or space disposed there between), "mounted to" includes "directly mounted to" (no intermediate materials, elements or space disposed there between) and "indirectly mounted to" (intermediate materials, elements or spaced disposed there between), and "electrically coupled" includes "directly electrically coupled to" (no intermediate materials or elements there between that electrically connect the elements together) and "indirectly electrically coupled to" (intermediate materials or elements there between that electrically connect the elements together). For example, forming an element "over a substrate" can include forming the element directly on the substrate with no intermediate materials/elements there between, as well as forming the element indirectly on the substrate with one or more intermediate materials/elements there between.

What is claimed is:

1. A method of programming a memory device comprising control gate lines, erase gate lines, select gate lines, source lines and bit lines connected to rows and columns of memory cells, the method comprising:
   performing an erase operation that includes applying a first voltage to one of the erase gate lines;
   performing a pre-program operation that includes electrically connecting the one of the erase gate lines to a pair of the control gate lines to use positive charge on the one of the erase gate lines from the erase operation to pre-charge the pair of the control gate lines; and
   performing a program operation that includes applying a second voltage to the one of the erase gate lines and the pair of the control gate lines.

2. The method of claim 1, comprising:
   during the erase operation, electrically connecting the pair of the control gate lines to a reference potential.

3. The method of claim 2, comprising:
   during the erase operation, electrically connecting a pair of the select gate lines to the reference potential.

4. The method of claim 3, wherein the reference potential is ground.

5. The method of claim 1, comprising:
   during the pre-program operation, applying a positive voltage to one of the select gate lines, applying a positive voltage to one of the source lines, and applying a current to one of the bit lines.

6. The method of claim 1, comprising:
   during the program operation, applying a positive voltage to one of the select gate lines, applying a positive voltage to one of the source lines, and applying a current to one of the bit lines.

7. The method of claim 1, comprising:
   after the program operation, electrically connecting the pair of the control gate lines and the one of the erase gate lines to a reference potential.

8. The method of claim 7, wherein the reference potential is ground.

9. The method of claim 1, comprising:
   during the pre-program operation, applying a third voltage to the one of the erase gate lines and the pair of the control gate lines.

10. A memory device, comprising:
    memory cells arranged in rows and columns, wherein respective memory cells includes a source region, a drain region, a floating gate, a control gate, a select gate and an erase gate;
    a first control gate line electrically connecting together the control gates in a first row of the memory cells;
    a second control gate line electrically connecting together the control gates in a second row of the memory cells, wherein the first control gate line is electrically connected to the second control gate line;
    an erase gate line electrically connecting together the erase gates in the first and second rows of the memory cells;
    a source line electrically connecting together the source regions in the first and second rows of the memory cells;
    a charge pump;
    a first switch to electrically connect, in its on state, the charge pump to the erase gate line, and to disconnect, in its off state, the charge pump from the erase gate line;
    a second switch to electrically connect, in its on state, the erase gate line to the first control gate line and the second control gate line, and to disconnect, in its off state, the erase gate line from the first control gate line and the second control gate line;
    a third switch to electrically connect, in its on state, the first control gate line and the second control gate line to a reference potential, and to disconnect, in its off state, the first control gate line and the second control gate line from the reference potential; and
    a control circuitry to:
      perform an erase operation that includes to place the first switch in its on state, to place the second switch in its off state, to place the third switch in its on state, and to cause the charge pump to generate a first voltage, so as to apply the first voltage from the charge pump to the erase gate line;
      perform a pre-program operation that includes to place the second switch in its on state, so as to cause a positive charge on the erase gate line from the erase operation to pre-charge the first and second control gate lines; and perform a program operation that includes to place the first switch in its on state, to place the second switch in its on state, and to cause the charge pump to generate a second voltage, so as to apply the second voltage from the charge pump to the erase gate line and to the first and second control gate lines.

11. The memory device of claim 10, wherein during the erase operation, the control circuitry to place the second switch in its off state and to place the third switch in its on state, and then to place the first switch in its on state.

12. The memory device of claim 10, wherein after the erase operation and before the pre-program operation, the control circuitry to place the first switch in its off state, and to place the third switch in its off state.

13. The memory device of claim 10, comprising:
a first select gate line electrically connecting together the select gates in the first row of the memory cells; and
a second select gate line electrically connecting together the select gates in the second row of the memory cells;

wherein during the pre-program operation, the control circuitry to apply a positive voltage to the first and second select gate lines, and to apply a positive voltage to the source line.

14. The memory device of claim 10, wherein during the pre-program operation, the control circuitry to place the first switch in its off state.

15. The memory device of claim 14, wherein during the pre-program operation, the control circuitry to place the third switch in its off state.

16. The memory device of claim 10, wherein during the pre-program operation, the control circuitry to place the first switch in its on state, and to cause the charge pump to generate a third voltage, so as to apply the third voltage from the charge pump to the erase gate line and to the first and second control gate lines.

* * * * *